United States Patent
James

(10) Patent No.: US 9,903,212 B2
(45) Date of Patent: Feb. 27, 2018

(54) MECHANICAL JOINING USING ADDITIVE MANUFACTURING PROCESS

(71) Applicant: Allister William James, Chuluota, FL (US)

(72) Inventor: Allister William James, Chuluota, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1247 days.

(21) Appl. No.: 13/954,030

(22) Filed: Jul. 30, 2013

(65) Prior Publication Data

US 2015/0037162 A1 Feb. 5, 2015

(51) Int. Cl.
| | |
|---|---|
| *F01D 25/24* | (2006.01) |
| *F01D 5/30* | (2006.01) |
| *B22F 3/105* | (2006.01) |
| *B22F 7/06* | (2006.01) |
| *B29C 67/00* | (2017.01) |
| *B23K 26/32* | (2014.01) |
| *B23K 26/342* | (2014.01) |

(Continued)

(52) U.S. Cl.
CPC ............. *F01D 5/30* (2013.01); *B22F 3/1055* (2013.01); *B22F 7/062* (2013.01); *B23K 26/32* (2013.01); *B23K 26/342* (2015.10); *B23P 15/04* (2013.01); *B29C 67/0077* (2013.01); *F01D 5/3061* (2013.01); *B22F 5/106* (2013.01); *B22F 2005/005* (2013.01); *B23K 2201/001* (2013.01); *B29L 2031/7504* (2013.01); *Y02P 10/295* (2015.11)

(58) Field of Classification Search
CPC ....... B21D 39/00; F04D 29/24; F04D 29/242; F04D 29/30; F04D 29/324; F04D 29/34; F04D 29/38; F04D 29/388; F01D 9/02; F01D 9/04; F01D 9/042; F01D 9/044; F01D 25/246; F01D 5/3061; F01D 5/30; F01D 25/24; F16B 7/0426; Y10T 403/47; Y10T 403/471; Y10T 403/472; Y10T 403/473; B29C 67/0077; Y02P 10/295; B29L 2031/7504; B23K 2201/001; B23K 26/342; B23K 26/32; B22F 2005/005; B22F 3/1055; B23P 15/04
USPC ............. 219/121.85; 29/527.1; 403/265–268
See application file for complete search history.

(56) References Cited

U.S. PATENT DOCUMENTS

| | | | |
|---|---|---|---|
| 4,080,513 A | | 3/1978 | Cuneo et al. |
| 5,312,650 A | * | 5/1994 | Dalal ........................ C23C 4/18 419/48 |

(Continued)

FOREIGN PATENT DOCUMENTS

| | | |
|---|---|---|
| CN | 1541790 A | 11/2004 |
| CN | 102676880 A | 9/2012 |

(Continued)

*Primary Examiner* — Logan Kraft
*Assistant Examiner* — Joshua R Beebe

(57) ABSTRACT

A method of manufacturing an assembly (10), including: positioning a first component (12) and a second component (14) in a desired positional relationship with each other; and building-up a locking component (16) by depositing layer after layer of material onto a surface (24, 26) of the assembly until a completed locking component is formed in-situ that holds the first component and the second component in the desired positional relationship.

12 Claims, 1 Drawing Sheet

(51) Int. Cl.
  *B23P 15/04*   (2006.01)
  *B22F 5/10*   (2006.01)
  *B22F 5/00*   (2006.01)
  *B23K 101/00*   (2006.01)
  *B29L 31/00*   (2006.01)

(56) References Cited

U.S. PATENT DOCUMENTS

| | | | |
|---|---|---|---|
| 5,630,700 A * | 5/1997 | Olsen | F01D 5/189 |
| | | | 415/134 |
| 6,519,500 B1 | 2/2003 | White | |
| 7,624,910 B2 | 12/2009 | Barnes et al. | |
| 2004/0108028 A1 * | 6/2004 | Guo | C22C 19/03 |
| | | | 148/676 |
| 2006/0118990 A1 | 6/2006 | Dierkes et al. | |
| 2007/0194085 A1 | 8/2007 | Spinella et al. | |
| 2009/0217517 A1 | 9/2009 | Pique et al. | |
| 2009/0269521 A1 | 10/2009 | Tuma | |
| 2011/0041313 A1 * | 2/2011 | James | F01D 9/044 |
| | | | 29/505 |
| 2013/0195673 A1 * | 8/2013 | Godfrey | B23P 15/04 |
| | | | 416/241 R |
| 2014/0163717 A1 * | 6/2014 | Das | B22F 3/1055 |
| | | | 700/119 |

FOREIGN PATENT DOCUMENTS

| | | |
|---|---|---|
| CN | 103717347 A | 2/2013 |
| EP | 2487005 A2 | 8/2012 |
| WO | 2012148233 A2 | 11/2012 |

\* cited by examiner

MECHANICAL JOINING USING ADDITIVE MANUFACTURING PROCESS

FIELD OF THE INVENTION

The present invention relates to mechanical joining of an assembly via a component formed in-situ via a layer-by-layer additive manufacturing process.

BACKGROUND OF THE INVENTION

In the field of gas turbine engines various parts of a single component may have widely varying operational requirements. Certain materials may be well suited for the operating requirements of one of the various parts, while another material may be better suited for the operating requirements of another. Modular components have therefore been used to tailor the materials used to the varying operational requirements. In this manner more expensive or difficult-to-fabricate materials may be limited to those parts of the component where needed, while less expensive or easier-to-fabricate materials can be used elsewhere. Furthermore, this modular approach to manufacturing a component allows for the replacement of individual modules rather than an entire component to extend service life of the component.

Joining of these components conventionally includes metallurgical joining such as welding and brazing. However, there are many high-temperature turbine materials that are very difficult to weld without cracking. This is less of a problem for braze joints, but braze joints are only as strong as the braze material. Mechanical joining offers advantages when joining dissimilar materials or materials that are difficult to weld. However, there are frequently concerns that mechanical joints may fail during service and liberate hardware into the engine. Consequently, there remains room in the art for improvement.

BRIEF DESCRIPTION OF THE DRAWINGS

The invention is explained in the following description in view of the drawings that show.

DETAILED DESCRIPTION OF THE INVENTION

The present inventor has devised an innovative approach for joining components to form an assembly. Specifically, components of the assembly are held relative to each other in a positional relationship that they are to have when they are part of the component. While the components are being held in the desired positional relationship a locking component that completes the assembly is formed in place on one of the other components of the assembly via an additive manufacturing process, where the locking component is formed layer-by-layer. An interlocking relationship within the assembly holds the assembly together, and the locking component ensures that interlocking elements of the interlocking relationship stay engaged with each other. The locking component therefore forms part of the assembly and is effective to ensure the interlocking relationship remains intact, thereby holding the assembly together.

Figure 1:
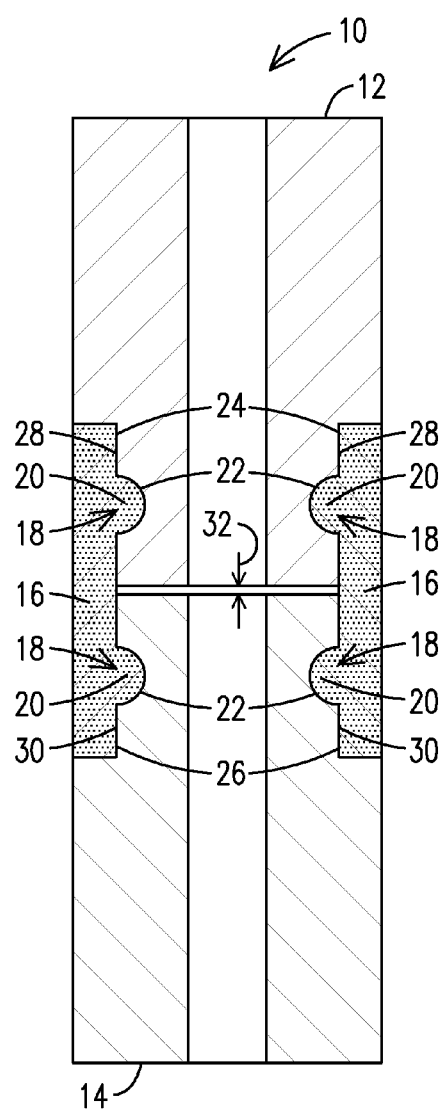
FIG. 1 is a schematic representation of an exemplary embodiment of the assembly.

FIG. 1 shows a schematic longitudinal cross-section of an exemplary embodiment of an assembly 10 having an elongated shape similar to an airfoil. The assembly 10 includes a first component 12, a second component 14, and a locking component 16. In this exemplary embodiment the assembly 10 is held together by two interlocking relationships 18 formed by a first interlocking feature 20 and a second interlocking feature 22 that engage each other. So long as the interlocking features 20, 22 are engaged with each other the interlocking relationship 18 is formed and this holds the assembly 10 together. Thus, the locking component 16 is configured to be part of the component 10 and to simultaneously ensure the interlocking relationship 18 remains intact. In this exemplary embodiment the first interlocking feature 20 for each interlocking relationship 18 is formed as part of the locking component 16. However, the locking component 16 may or may not include geometry that forms part of the interlocking relationship 18. Instead, the locking component 16 is formed to ensure the interlocking relationship 18 remain intact, regardless of which components of the assembly 10 actually include the geometric features that form the interlocking relationship 18.

The locking component 16 may be formed by an additive manufacturing process which can be defined as a process of joining materials to make three dimensional solid objects from a digital model, layer upon layer. This is in contrast to subtractive manufacturing methodologies which rely on the removal of material using techniques such as cutting, drilling, milling and grinding etc. One of many possible examples of an additive manufacturing process envisioned for this method is Laser Engineered Net Shaping (LENS). In this process a metal powder is injected into a molten pool created by a laser beam. The component being formed sits on a surface that may be moved under the laser's focal point, and the laser may be elevated after forming a layer in order to form another layer on top of the formed layer. The component formed is considered to be fully dense (fully sintered) and therefore fully formed when the final shape is reached. Further, the locking component may be ceramic, or as in the exemplary embodiment, it may be metal.

As a result of this layer-by-layer approach, a powder metallurgy component formed via a layer-by-layer additive process has a unique microstructure when compared to components made using other powder metallurgy processes. First, a grain size in the grain structure of the component is limited to a thickness of the deposited layer in which the grain resides because a size of a pool of melted material formed by the process is limited to approximately the thickness of the layer, and the size of the weld pool limits the size of the grain. (The size of the weld pool is, in turn, controlled by the heat input from the laser and the thickness of the powder layer.) The small volume of the molten material and the fast cooling rate effectively prevent grain growth. Therefore, since each layer is essentially fully formed when deposited, any grains within the layer cannot grow to be any thicker than a thickness of the layer itself. While a subsequent layer formed on top of the first layer may melt an upper portion of the first layer in order to bond thereto, any grains present in the first layer do not grow into the second layer.

Second, in the layer-by-layer approach the grains in the component would have a laminar structure as a result of the layering process. In contrast, in conventional powder metallurgy processes the individual powder particles do not melt, rather they join together via inter-diffusion when exposed to high temperatures (below the melting point) in the sintering process. The powder particles have a random orientation to each other and the interfaces between the particles become the grain boundaries. This results in a structure that is more uniformly equiaxed in conventional powder metallurgy processes. The laminar structure that results from the layer-by-layer process can lead to anisotropic properties, (where there may be differences in properties measured parallel to the build direction than properties 90 degrees to the build direction).

Several advantages can be realized from this method of forming this type of assembly. For example, if the assembly 10 of FIG. 1 is an airfoil used in a gas turbine engine, and if the first component 12 is an airfoil portion while the second component 14 is a tip coupon, (in such an exemplary embodiment the locking component 16 may take the shape of a ring or cylinder), both of these components could benefit from having different compositions. Specifically, the airfoil portion may required to have greater creep resistance in environments such as those created by hot combustion gases in a gas turbine engine, but need not necessarily be particularly abrasive. The tip coupon portion, which may encounter an abradable portion of a shroud or ring segment, may need greater abrasive properties. As often occurs in gas turbine assemblies, the best choice of material for the first component 12 may not be metallurgically compatible with the best choice of material for the second component 14. This incompatibility makes it very difficult if not impossible to join the components via welding. Any such weld produced may be less than desirable due to cracking etc. Strength requirements may preclude the use of braze, and debris concerns may prevent the use of conventionally mechanically joined assemblies (e.g. bolting). Thus, in some instances it has not been possible to form a metallurgically ideal assembly. This method overcomes this problem by permitting the creation of an assembly that meets the varying metallurgical, cost, and reliability needs etc of the assembly without any worry associated with welding, brazing, and conventional mechanical joining. Another advantage includes the ability to replace an individual component rather than the entire assembly to extend service life. In order to facilitate disassembly of the assembly and replacement of individual components, or for any other reason deemed important, it may be desirable to form the locking component such that there is no metallurgical bond between the locking component and a surface of the component of the assembly onto which the first layer of the locking component is deposited. For example, in the exemplary embodiment of FIG. 1, the locking component 16 is formed on both a surface 24 of the first component 12 and a surface 26 of the second component 14. If, on the other hand, a metallurgical bond is to be formed at an interface 28 between the surface 24 of the first component 12 and the locking component 16 and/or an interface 30 between the surface 26 of the second component 14 and the locking component 16, then the surfaces 24, 26 may be appropriately cleaned to permit the metallurgical bond to form. Appropriate cleaning is known to those in the art to be similar to the cleaning necessary in welding operations to permit the formation of a proper weld. In contrast, if no metallurgical bond is to be formed at the interface 28 or the interface 30, then the cleaning step may be eliminated. Alternately, if no bond is to be formed, an oxide layer may be allowed to form on either or both of the surface 24 of the first component 12 and the surface 26 of the second component 14. The oxide layer may or may not be burned off during the application of the first layer of the additive manufacturing process, but in either case it is likely to prevent the formation of a metallurgical bond between the locking component 16 and any surface used as the base for the first layer.

Gas turbine engine assemblies often experience thermal growth mismatch within the assembly. This may occur when, for example, dissimilar materials wish to respond differently to a thermal change but are forced to respond identically, such as when dissimilar materials are welded together. Using the method disclosed herein, an assembly 10 can be fabricated that reduces or eliminates this problem by strategic positioning of the components. For example, in FIG. 1 the first component 12 and the second component 14 are disposed end-to-end. This allows for each component to respond to thermal changes independently of the other. In addition a gap 32 may be built-in to the assembly 10 such that when the assembly 10 is at an operating temperature any thermal growth of the components toward each other will be accommodated by the gap 32, thereby eliminating any stresses that may otherwise result.

Figure 2:
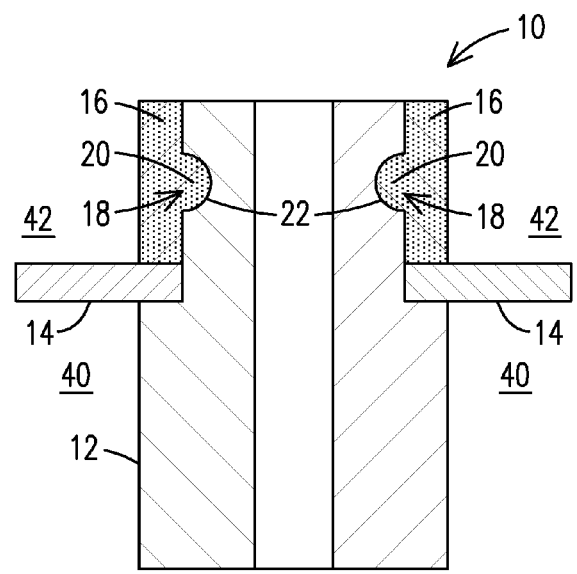
FIG. 2 is a schematic representation of an alternate exemplary embodiment of the assembly.

FIG. 2 shows a schematic longitudinal cross-section of another exemplary embodiment of the assembly 10. Here again the first component 12 and the second component 14 are held in place by the locking component 16. However, in this exemplary embodiment the second component 14 is assembled onto the first component 12 and the locking component 16 is then formed. The locking component 16 interlocks only with the first component 12, while the second component is held in place simply by the presence of the first component 12 and the locking component 16. In this exemplary embodiment the assembly 10 may be a gas turbine engine vane where the first component 12 is an airfoil component and the second component 14 is a shroud joined to the airfoil component via the locking component 16. In such an assembly 10 hot gases are usually present on a hot gas side 40 of the second component 14. By locating the locking component 16 on a relatively cool side 42 of the second component 14, the material selected to be used in the locking component 16 need not withstand the operating environment created by the hot gases. Consequently, since materials that can withstand that operating environment are often more expensive and more difficult to fabricate, this configuration saves on material costs and assembly costs.

Figure 3:
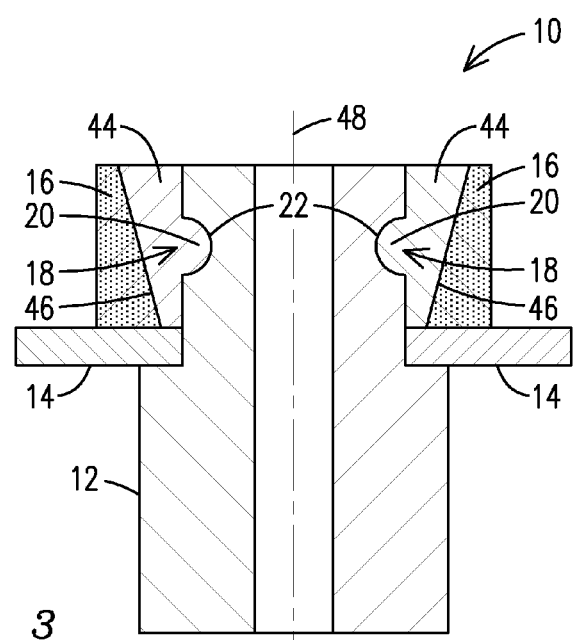
FIG. 3 is a schematic representation of yet another alternate exemplary embodiment of the assembly.

In yet another exemplary embodiment that is a variation of FIG. 2, FIG. 3 depicts a longitudinal cross-section of the assembly 10, having a third component 44. The third component 44 may be modular in construction, for example a split ring, and the third component 44 and the first component have the first interlocking feature 20 and the second interlocking feature 22 respectively and hence form the interlocking relationship 18. The locking component 16 holds the third component 44 in place, and hence the locking component 16 effectively ensures the interlocking relationship 18 of the first component 12 and the third component 44 is maintained. As shown an interface 46 between the locking component 16 and the third component 44 is angled with respect to a longitudinal axis 48 of the assembly 10. This configuration is advantageous if there is no metallurgical bond at the interface 46, since the geometry of the assembly 10 will hold the locking component 16 in place. Alternately, should there be no angle desired between the interface 46 and the longitudinal axis 48 of the assembly 10, a metallurgical bond may be allowed to form at the interface such that the locking component 16 is metallurgically bonded to the third component 44. This metallurgical bond would hold the locking component 16 in place and thereby hold the interlocking relationship 18 in place. Further, in this configuration the locking component 16 is isolated from the first component 12 and the second component 14, which may prevent compatibility problems were they not isolated from each other.

From the foregoing it is evident that the present inventor has created a unique way of fabricating assemblies and that this unique method can produce assemblies that solve known problems in the art. However, the solution uses technologies that can be readily applied, and so the implementation can be fast and inexpensive. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine assembly, comprising:
   a first component and a second component of the gas turbine engine assembly; and
   a locking component formed via a layer-by-layer additive manufacturing process, wherein each layer of the locking component is fully formed when deposited, and wherein the locking component secures the first component, the second component, and the locking component together in an interlocking relationship.

2. The assembly of claim 1, wherein the layer-by-layer additive manufacturing process comprises laser engineered net shaping.

3. The assembly of claim 1, wherein the locking component interlocks with the first component, and wherein the second component is held in place relative to the first component at least by the locking component.

4. The assembly of claim 3, wherein the locking component further interlocks with the second component.

5. The assembly of claim 1, wherein the first component comprises an airfoil component, wherein the second component comprises a shroud component assembled onto the airfoil component, and wherein the locking component interlocks with the airfoil component and holds the shroud component in place.

6. The assembly of claim 1, wherein the first and the second component are held together by an interlocking arrangement maintained by the locking component.

7. The assembly of claim 6, wherein the assembly further comprises a third component, wherein the interlocking arrangement is positioned between the first component and the third component, and wherein the locking component is arranged so as to prevent the third component from disengaging from the first component.

8. The assembly of claim 7, wherein the first component comprises an airfoil component, wherein the second component comprises a shroud component assembled onto the airfoil component, wherein the third component comprises a modular construction that interlocks with the airfoil component, and wherein the locking component holds the modular construction in place.

9. The assembly of claim 1, wherein the assembly comprises no metallurgical bond to the locking component.

10. The assembly of claim 1, wherein the first component and the second component are assembled in a manner that permits differential thermal expansion.

11. A gas turbine engine assembly comprising:
    a first component and a second component; and
    a locking component formed via a layer-by-layer additive manufacturing process and comprising a laminar grain structure, wherein each layer of the locking component is fully formed when deposited, and wherein the locking component secures the first component, the second component, and the locking component together in a mechanically interlocking relationship,
    wherein the first and the second component are held together by an interlocking arrangement maintained by the locking component, wherein the interlocking arrangement is between the first component and a third component;
    wherein the locking component prevents the third component from disengaging from the first component; and
    wherein:
        the first component comprises an airfoil component;
        the second component comprises a shroud component assembled onto the airfoil component; and
        the third component comprises a modular construction that mechanically interlocks with the airfoil component, and wherein the locking component holds the modular construction in place.

12. The gas turbine engine assembly of claim 11, wherein the locking component and the third component comprise abutting and corresponding beveled surfaces.

* * * * *